United States Patent
Niu et al.

(10) Patent No.: US 8,942,452 B2
(45) Date of Patent: Jan. 27, 2015

(54) APPARATUS AND METHOD FOR SMOOTHING RANDOM EVENT DATA OBTAINED FROM A POSITRON EMISSION TOMOGRAPHY SCANNER

(75) Inventors: Xiaofeng Niu, Mundelein, IL (US); Wenli Wang, Briarcliff Manor, NY (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 302 days.

(21) Appl. No.: 13/475,584

(22) Filed: May 18, 2012

(65) Prior Publication Data
US 2013/0308873 A1  Nov. 21, 2013

(51) Int. Cl.
*G06T 5/00* (2006.01)

(52) U.S. Cl.
USPC ............................ 382/131; 382/275

(58) Field of Classification Search
CPC ............ G06T 5/00; G06T 5/002; G06T 5/20; G06T 2207/10104; G06T 2207/20182; G06K 9/40; A61B 6/037; A61B 6/5258; A61B 2576/00
USPC ................ 382/128, 131, 264, 275
See application file for complete search history.

(56) References Cited

U.S. PATENT DOCUMENTS

| 2009/0161933 A1 | 6/2009 | Chen ............................ 382/131 |
| 2010/0124361 A1 | 5/2010 | Gaddy .......................... 382/107 |
| 2012/0002859 A1 | 1/2012 | Huang et al. .................. 382/131 |

FOREIGN PATENT DOCUMENTS

| JP | 61-132887 A | 6/1986 | ............. G01T 1/161 |
| JP | 2009-42029 A | 2/2009 | ............. G01T 1/161 |
| JP | 2011-507603 A | 3/2011 | ............... A61B 6/03 |
| JP | 2012-506092 A | 3/2012 | ............... G06T 7/20 |
| JP | 2012-521247 A | 9/2012 | ............. A61B 5/055 |
| WO | WO 2009/082531 A1 | 7/2009 | ............. G06T 11/00 |

(Continued)

OTHER PUBLICATIONS

International Search Report and Written Opinion issued Jul. 2, 2013 in PCT/JP2013/063829 with English translation of category of cited documents.

(Continued)

*Primary Examiner* — Andrew W Johns
(74) *Attorney, Agent, or Firm* — Oblon, Spivak, McClelland, Maier & Neustadt, L.L.P.

(57) ABSTRACT

A method and apparatus for smoothing random event data obtained from a Positron Emission Tomography (PET) scanner. The method includes obtaining initial random event data $u(s, \phi, t=0)=u_0(s, \phi)$, corresponding to t=0, calculating second-order central differences $u_{ss}$, $u_{\phi\phi}$ with respect to s, $\phi$, calculating a gradient $u_t$, using $u_t=2(u_{ss}+u_{\phi\phi})-\lambda(u-u_0)$, where $\lambda$ is a constant parameter, and updating the random event data using $u(s, \phi, t_2)=u(s, \phi, t_1)+\Delta t\, u_t$, where $\Delta t=t_2-t_1$, $t_1=0$ in a first iteration, and $\Delta t$ is greater than 0. The method repeats the steps of calculating the second-order central differences, calculating the gradient, and updating the random event data until a change in $u(s, \phi, t)$ from a previous iteration is less than a predetermined threshold value.

22 Claims, 5 Drawing Sheets

(56) References Cited

FOREIGN PATENT DOCUMENTS

| WO | WO 2010/044963 A1 | 4/2010 | ............... H04N 7/12 |
| WO | WO 2010/109349 A1 | 9/2010 | ........... G01R 33/561 |

OTHER PUBLICATIONS

Yuichiro Mukai, et al., "A Study on Norm Selection for CV Algorithms", IEICE Technical Report, DE2011-13, PRMU2011-44, 2011, pp. 73-78 with English Abstract.

Kei Kawamura, et al., "Fast Computation Method for Total Variation Minimization", NII—Electronic Library Service, D vol. J93-D, No. 3, 2010, pp. 326-335.

Hongbin Guo, et al., "FDG-PET Parametric Imaging by Total Variation Minimization", Computerized Medical Imaging and Graphics, vol. 33,(4) 2009, pp. 1-22.

Xinhui Duan, et al., "Few-View Projection Reconstruction with an Iterative Reconstruction-Reprojection Algorithm and TV Constraint", IEEE Transactions on Nuclear Science, vol. 56, No. 3 Jun. 2009, pp. 1377-1382.

APPARATUS AND METHOD FOR SMOOTHING RANDOM EVENT DATA OBTAINED FROM A POSITRON EMISSION TOMOGRAPHY SCANNER

BACKGROUND

1. Field

The present disclosure generally relates to random estimation in Positron Emission Tomography (PET) reconstruction.

2. Background

The most accurate and commonly used method for random estimation in Positron Emission Tomography (PET) reconstruction is the delayed coincidence window estimation, in which the correlation between the paired photons generated from a single annihilation can be totally removed, thus leaving only random events. However, due to the limited coincidence window and short acquisition time, statistically, the measured delay data is only one realization of the true random data distribution. Therefore, if not processed properly, the variance will increase in the prompt data after subtracting the delayed coincidence window data.

There are many image smoothing techniques developed in a uniformly sampled data space, such as Fourier analysis, to remove high frequency noise. The directly acquired delay raw sinogram, however, is not in a uniformly sampled space. If the delay raw sinogram could be converted into a uniformly sampled interpolated-sinogram, then various standard smoothing techniques could be used. The data could then be back-interpolated to the irregular-sampled raw sinogram space after random sinogram smoothing in the uniformly interpolated-sinogram space.

Noise represents the high frequency components in the spectrum of the noisy random sinogram. Random sinogram smoothing can be applied by filtering out the high frequencies in the Fourier domain. But the smoothing will also cause large changes in the signals that are present in the random sinogram distribution. Furthermore, the Fourier method is a global representation of the signal and will fail for images with an irregular mask, as in the case of random sinogram smoothing in which the interpolated random sinogram is restricted inside a mask containing all the measurable line-of-responses. The mask represents the measurable region in the image. Thus, any region outside the mask will not be measurable and thus have pixel intensity of zero.

BRIEF DESCRIPTION OF THE DRAWINGS

The disclosure will be better understood from reading the description which follows and from examining the accompanying figures. These figures are provided solely as non-limiting examples of the embodiments, wherein.

DETAILED DESCRIPTION

In one embodiment, there is provided a method and apparatus for smoothing random event data obtained from a Positron Emission Tomography (PET) scanner. In one embodiment, the method includes obtaining initial random event data $u(s, \phi, t=0)=u_0(s, \phi)$, corresponding to $t=0$, calculating second-order central differences $u_{ss}$, $u_{\phi\phi}$ with respect to s, $\phi$, calculating a gradient $u_t$, using $u_t=2(u_{ss}+u_{\phi\phi})-\lambda(u-u_0)$, where $\lambda$ is a constant parameter; updating the random event data using $u(s, \phi, t_2)=u(s, \phi, t_1)+\Delta t\, u_t$, where $\Delta t=t_2-t_1$, $t_1=0$ in a first iteration, and $\Delta t$ is greater than 0, and repeating the steps of calculating the second-order central differences, calculating the gradient, and updating the random event data until a change in $u(s, \phi, t)$ from a previous iteration is less than a predetermined threshold value.

Further, in an embodiment of the method, $\lambda$ has a value between 0.05 and 2.0. On the other hand, in an embodiment of the method, $\lambda$ has a value between 0 and 0.01. Moreover, in the method, $\Delta t$ has a value between 0.05 and 0.1, and $u(s, \phi, t)$ converges when $$\sum_{alls}\sum_{all\varphi}(u(s, \varphi, t_k)-u(s, \varphi, t_{k+1}))^2$$

is less than the predetermined threshold value.

In one embodiment, the method includes obtaining initial random event data $u(s, \phi, z, \theta, t=0)=u_0(s, \phi, z, \theta)$, corresponding to $t=0$, calculating second-order central differences $u_{ss}$, $u_{\phi\phi}$, $u_{zz}$, $u_{\theta\theta}$, with respect to s, $\phi$, z, $\theta$, calculating a gradient $u_t$, using $u_t=2(u_{ss}+u_{\phi\phi}+u_{zz}+u_{\theta\theta})-\lambda(u-u_0)$, where $\lambda$ is a constant parameter, updating the random event data using $u(s, \phi, z, \theta, t_2)=u(s, \phi, z, \theta, t_1)+\Delta t\, u_t$, where $\Delta t=t_2-t_1$, $t_1=0$ in a first iteration, and $\Delta t$ is greater than 0, and repeating the steps of calculating the second-order central differences, calculating the gradient, and updating the random event data until a change in $u(s, \phi, z, \theta, t)$ from a previous iteration is less than a predetermined threshold value.

Further, in an embodiment of the method, $\lambda$ has a value between 0.05 and 2.0. On the other hand, in an embodiment of the method, $\lambda$ has a value between 0 and 0.01. Moreover, in the method, $\Delta t$ has a value between 0.05 and 0.1, and $u(s, \phi, z, \theta, t)$ converges when $$\sum_{alls}\sum_{all\varphi}\sum_{allz}\sum_{all\theta}(u(s, \varphi, z, \theta, t_k)-u(s, \varphi, z, \theta, t_{k+1}))^2$$

is less than the predetermined threshold value. In addition, the method further includes applying a mask so that the obtained initial random event data is restricted to a region containing all measurable line-of-responses of the PET scanner.

The present disclosure describes, in one embodiment, a random sinogram smoothing method for iteratively minimizing the L-2 norm of the sinogram image gradients. The sinogram image gradient is calculated as the summation of local gradients at each pixel in the sinogram space.

In two-dimensional (2D) smoothing, let $u_0(s, \phi)$ denote the pixel intensity value of a noisy image with s, $\phi \in \Omega$ and let $u(s, \phi)$ denote the true noiseless image. The imaging model is then written as follows:

$u_0(s, \phi)=u(s, \phi)+n(s, \phi)$ in which $u(s, \phi)$ is additive noise (e.g., Gaussian) and $E[u_0(s, \phi)]=u(s, \phi)$.

The objective is to estimate $u(s, \phi)$ from $u_0(s, \phi)$ under the criterion of minimal L2 norm of image gradients. For clarity of the derivation below, u, $u_0$ are used to represent $u(s, \phi)$ and $u_0(s, \phi)$. The optimization problem is $$\min_u J = \min_u \left\{ \int_\Omega (u_s^2 + u_\varphi^s) ds d\varphi + \lambda \frac{1}{2} \|u - u_0\|_2^2 \right\} \quad (1)$$

with $\|u-u_0\|_2^2 = (u-u_0)^2$, $u_s = \partial u/\partial s$, $u_\phi = \partial u/\partial \phi$.

Thus, the objective function to be minimized is the following:

$$J = \int_\Omega L(x,y,u,u_s,u_\phi) ds d\phi = \int_\Omega \{u_s^2 + u_\phi^2 + \lambda^{1/2}(u-u_0)^2\} ds d\phi. \quad (2)$$

By using the Euler-Lagrange equation, we have $$u_t = 2(u_{ss} + u_{\varphi\varphi}) - \lambda(u - u_0) \quad (3)$$

where $$u_{ss} = \frac{\partial^2 u}{\partial s^2}, u_{\varphi\varphi} = \frac{\partial^2 u}{\partial \varphi^2}.$$

The variable t is introduced as an artificial time to parameterize the descent direction, and $u_t$ represents the gradient along the t direction. $u_0$ represents the evolving image at t=0, which is the original noisy image $u(s, \phi, 0) = u_0(s, \phi)$. In the above-equations, $\lambda$ is a constraint parameter used to add a different amount of constraint when the smoothed image is much different from the original noisy image. For the case of strong noise (for example, where the noise overwhelms the signal (or image)), $\lambda=0$ or $\lambda$ is set to a very small value, for example, approximately less than 0.01, and greater than 0. In the case of weak noise, $\lambda$ is set between, approximately 0.5 and 2.

The image is then updated with the following equation:

$$u(s,\phi,t_2) = u(s,\phi,t_1) + (t_2 - t_1) u_t. \quad (4)$$

In equation (4), $\Delta t = t_2 - t_1$ represents the stability limit, which is set to a small value between, approximately, 0.05 and 0.1. As t increases, a de-noised image is obtained.

Figure 3:
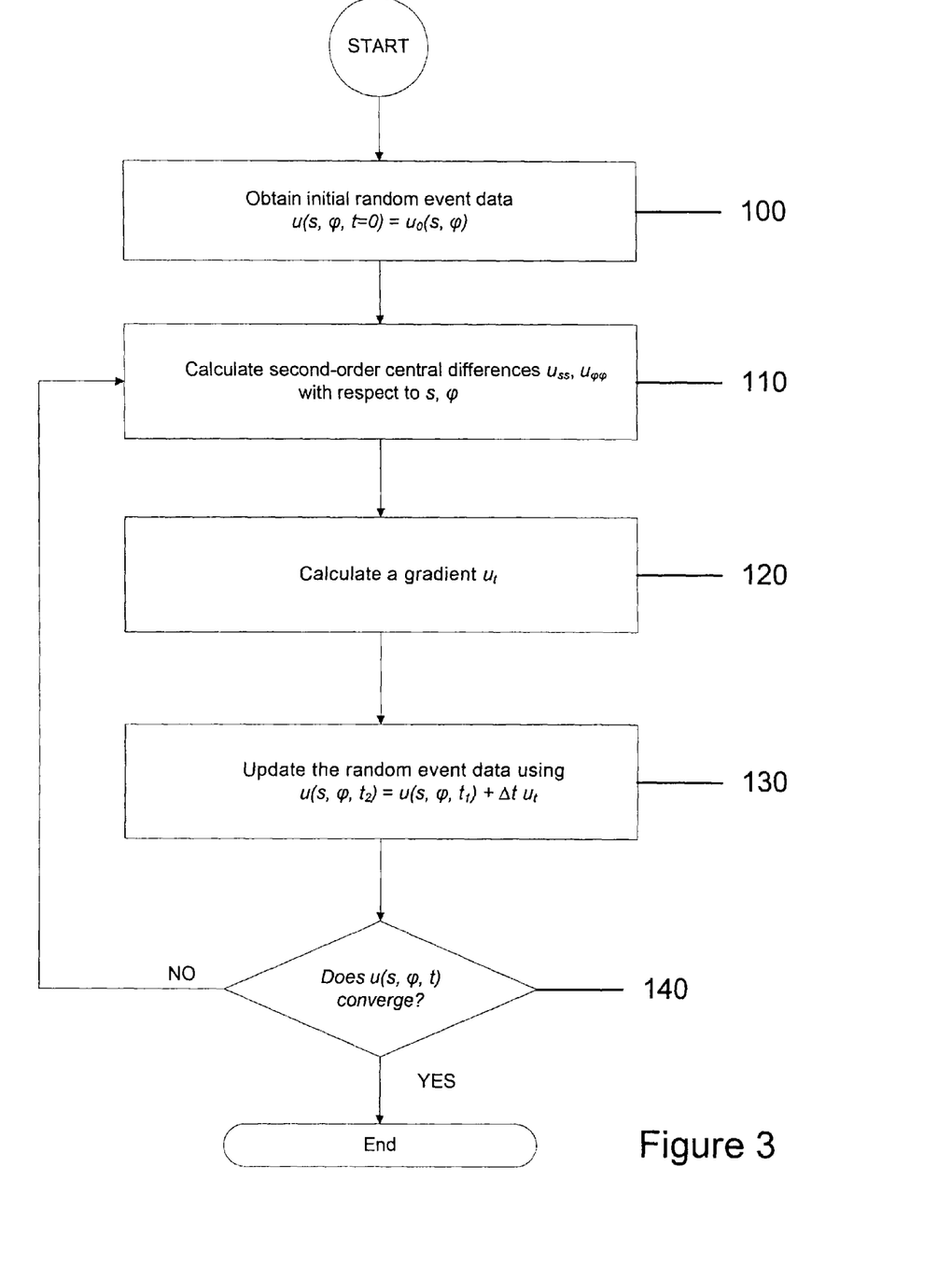
FIG. 3 is a flow diagram of a method of an embodiment of the present disclosure.

FIG. 3 is a flowchart of a method for random variance reduction of event data obtained from a PET scanner.

In step 100, initial random event data $u(s, \phi, t=0) = u_0(s, \phi)$, is obtained at t=0.

In step 110, second-order central differences $u_{ss}$, $u_{\phi\phi}$ are calculated with respect to s, $\phi$. Specifically, the second-order central differences are calculated as follows:

$$u_{xx} = (u(x+1,y) - u(x,y)) - (u(x,y) - u(x-1,y))$$

$$u_{yy} = (u(x,y+1) - u(x,y)) - (u(x,y) - u(x,y-1)).$$

Next, in step 120, a gradient $u_t$ is calculated using $u_t = 2(u_{ss} + u_{\phi\phi}) - \lambda(u - u_0)$, where $\lambda$ is a constant parameter.

In step 130, the random event data is updated using $u(s, \phi, t_2) = u(s, \phi, t_1) + \Delta t\, u_t$, where $\Delta t = t_2 - t_1$, where $t_1 = 0$ in a first iteration, and where $\Delta t$ is greater than 0.

In step 140, it is decided whether $u(s, \phi, t)$ converges, i.e., whether the change in $u(s, \phi)$ using a suitable norm, is less than a threshold value. If $u(s, \phi, t)$ converges, then the process ends. However, if $u(s, \phi, t)$ does not converge, steps 110-130 are repeated. The convergence of $u(s, \phi, t)$ can be determined by checking whether $$\sum_{alls} \sum_{all\varphi} (u(s, \varphi, t_k) - u(s, \varphi, t_{k+1}))^2$$

is less than a predetermined threshold.

Figure 1:
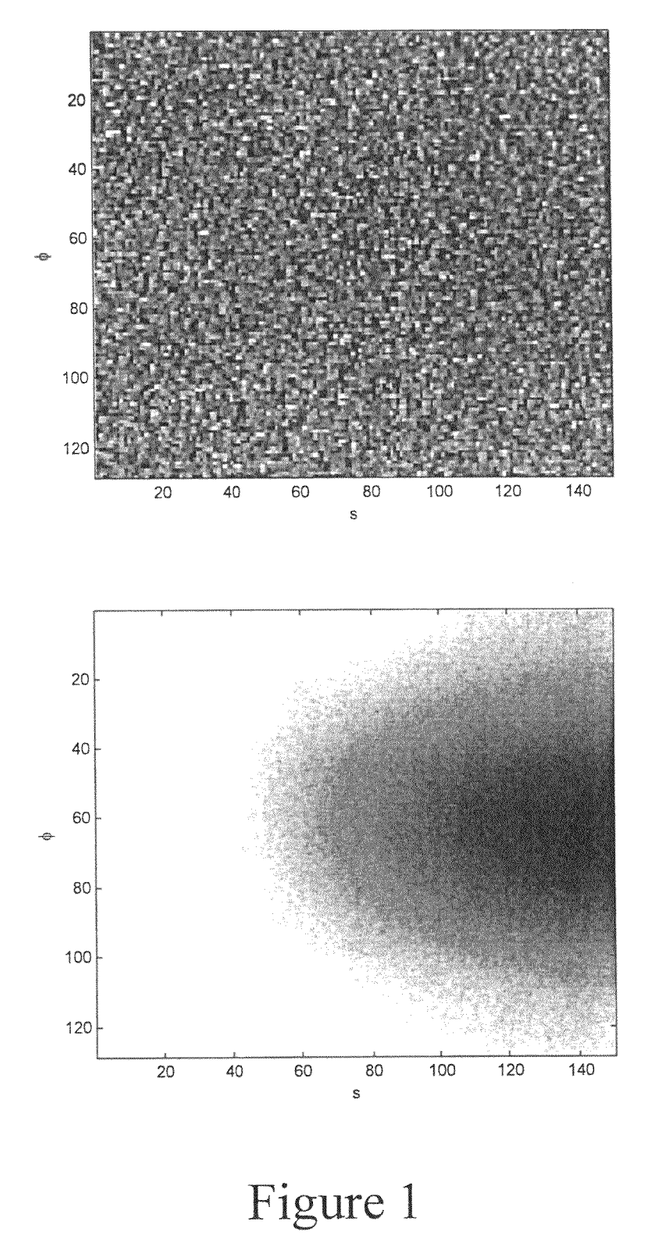
FIG. 1 illustrates interpolated random sinograms before and after random variance reduction.
Figure 2:
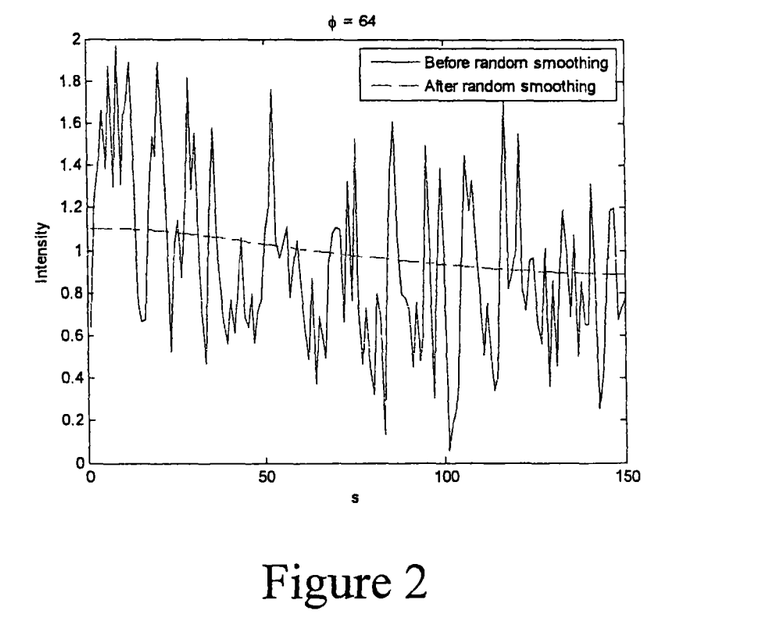
FIG. 2 illustrates profiles of $\phi=64$ in FIG. 1, before and after random variance reduction.

FIGS. 1 and 2 show example results implementing the above method of FIG. 3 on test data. FIG. 1 illustrates interpolated random sinograms before and after random variance reduction (from one (s, $\phi$) slice). FIG. 2 illustrates profiles of ($\phi$=64 in FIG. 1, before and after random variance reduction.

In applying the above-discussed method to four-dimensional (4D) smoothing, the optimization problem for 4D data $u(s, \phi, z, \theta)$ is as follows:

$$\min_u J = \min_u \left\{ \int_\Omega (u_s^2 + u_\varphi^s + u_z^2 + u_\theta^2) ds d\varphi dz d\theta + \lambda \frac{1}{2} \|u - u_0\|_2^2 \right\}, \quad (5)$$

where $\Omega$ represents the irregularly shaped region defined in the mask. The region defined in the mask does not have to be a rectangular cuboid.

The image is updated with the equation $u(s, \phi, z, \theta, t_2) = u(s, \phi, z, \theta, t_1) + (t_2 - t_1) u_t$, where $u_t = 2(u_{ss} + u_{\phi\phi} + u_{zz} + u_{\theta\theta}) - \lambda(u - u_0)$.

Figure 4:
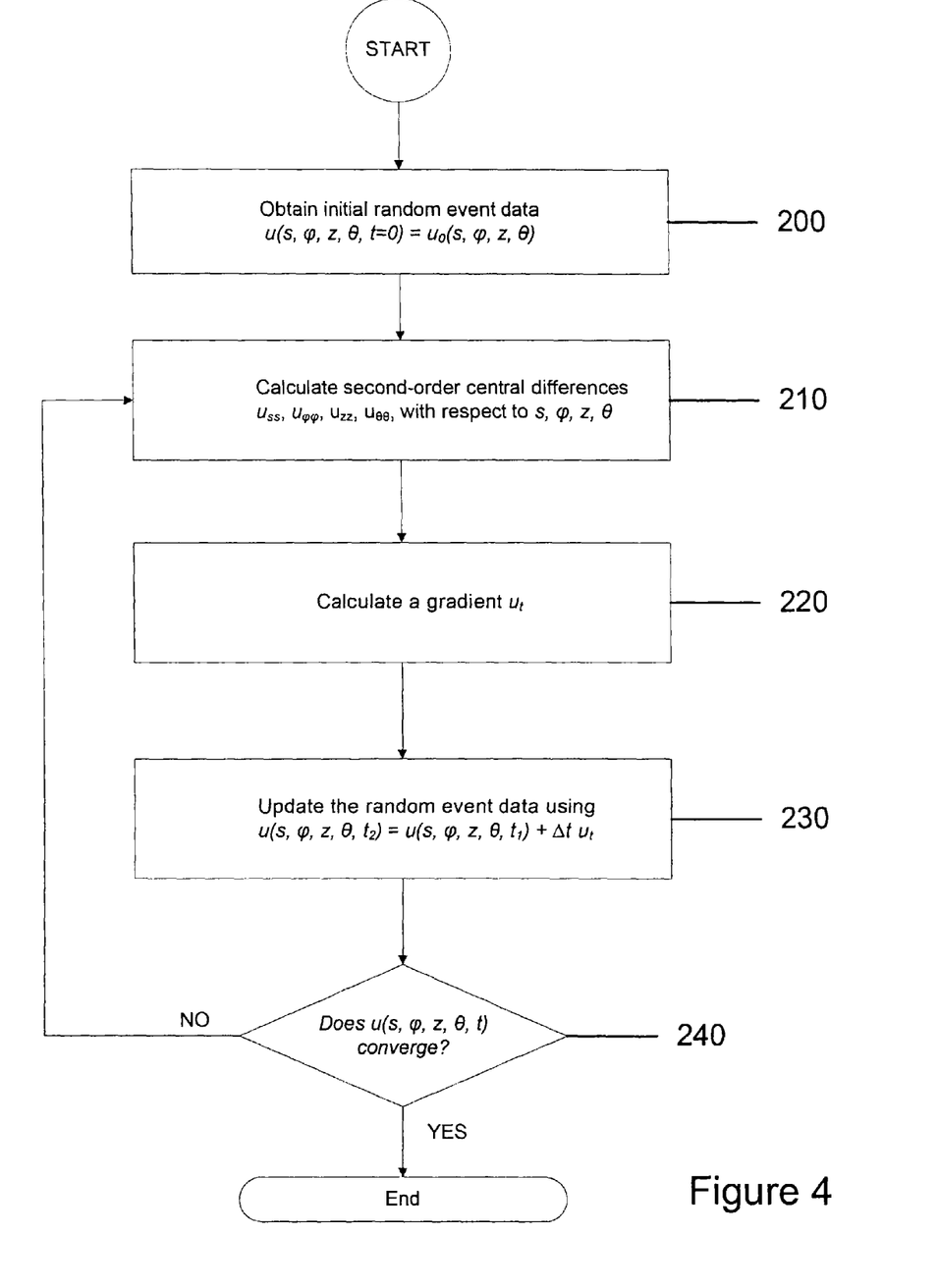
FIG. 4 is a flow diagram of a method of an embodiment of the present disclosure.

FIG. 4 is a flowchart of a method for random variance reduction of event data obtained from a PET scanner.

In step 200, initial random event data $u(s, \phi, z, \theta, t=0) = u_0(s, \phi, z, \theta)$, is obtained at t=0.

In step 210, second-order central differences $u_{ss}$, $u_{\phi\phi}$, $u_{zz}$, $u_{\theta\theta}$, are calculated with respect to s, $\phi$, z, $\theta$. Specifically, the second-order central differences are calculated as follows:

$$u_{ss} = (u(s+1,\phi,z,\theta) - u(s,\phi,z,\theta)) - (u(s,\phi,z,\theta) - u(s-1,\phi,z,\theta)),$$

$$u_{\phi\phi} = (u(s,\phi+1,z,\theta) - u(s,\phi,z,\theta)) - (u(s,\phi,z,\theta) - u(s,\phi-1,z,\theta)),$$

$$u_{zz} = (u(s,\phi,z+1,\theta) - (s,\phi,z,\theta)) - (u(s,\phi,z,\theta) - u(s,\phi z, \theta-1))$$

$$u_{\theta\theta} = (u(s,\phi,z,\theta+1) - u(s,\phi,z,\theta)) - (u(s,\phi,z,\theta) - u(s,\phi,z,\theta-1)).$$

Next, in step 220, a gradient $u_t$ is calculated using $u_t = 2(u_{ss} + u_{\phi\phi} + u_{zz} + u_{\theta\theta}) - \lambda(u - u_0)$, where $\lambda$ is a constant parameter.

In step 230, the random event data is updated using $u(s, \phi, z, \theta, t_2) = u(s, \phi, z, \theta, t_1) + \Delta t\, u_t$, where $\Delta t = t_2 - t_1$, where $t_1 = 0$ in a first iteration, and where $\Delta t$ is greater than 0.

In step 240, it is decided whether $u(s, \phi, z, \theta, t)$ converges, i.e., whether the change in $u(s, \phi, z, \theta)$ using a suitable norm, is less than a threshold value. If $u(s, \phi, z, \theta, t)$ converges, then the process ends. However, if $u(s, \phi, z, \theta, t)$ does not converge, steps 210-230 are repeated. The convergence of $u(s, \phi, z, \theta, t)$ can be determined by checking whether $$\sum_{alls} \sum_{all\varphi} \sum_{allz} \sum_{all\theta} (u(s, \varphi, z, \theta, t_k) - u(s, \varphi, z, \theta, t_{k+1}))^2$$

is less than a predetermined threshold. The method may additionally include a step of applying a mask so that the obtained initial random event data is restricted to a region containing all measurable line-of-responses of the PET scanner.

The aforementioned second-order partial derivatives $u_{ss}$, $u_{\phi\phi}$, $u_{zz}$, $u_{\theta\theta}$ are calculated on the voxels confined by the mask. If the voxels are a boundary of the mask, the partial derivative is set to zero in the direction where it crosses the boundary.

An advantage of the discussed embodiments is that the methods are flexible to apply any mask.

Figure 5:
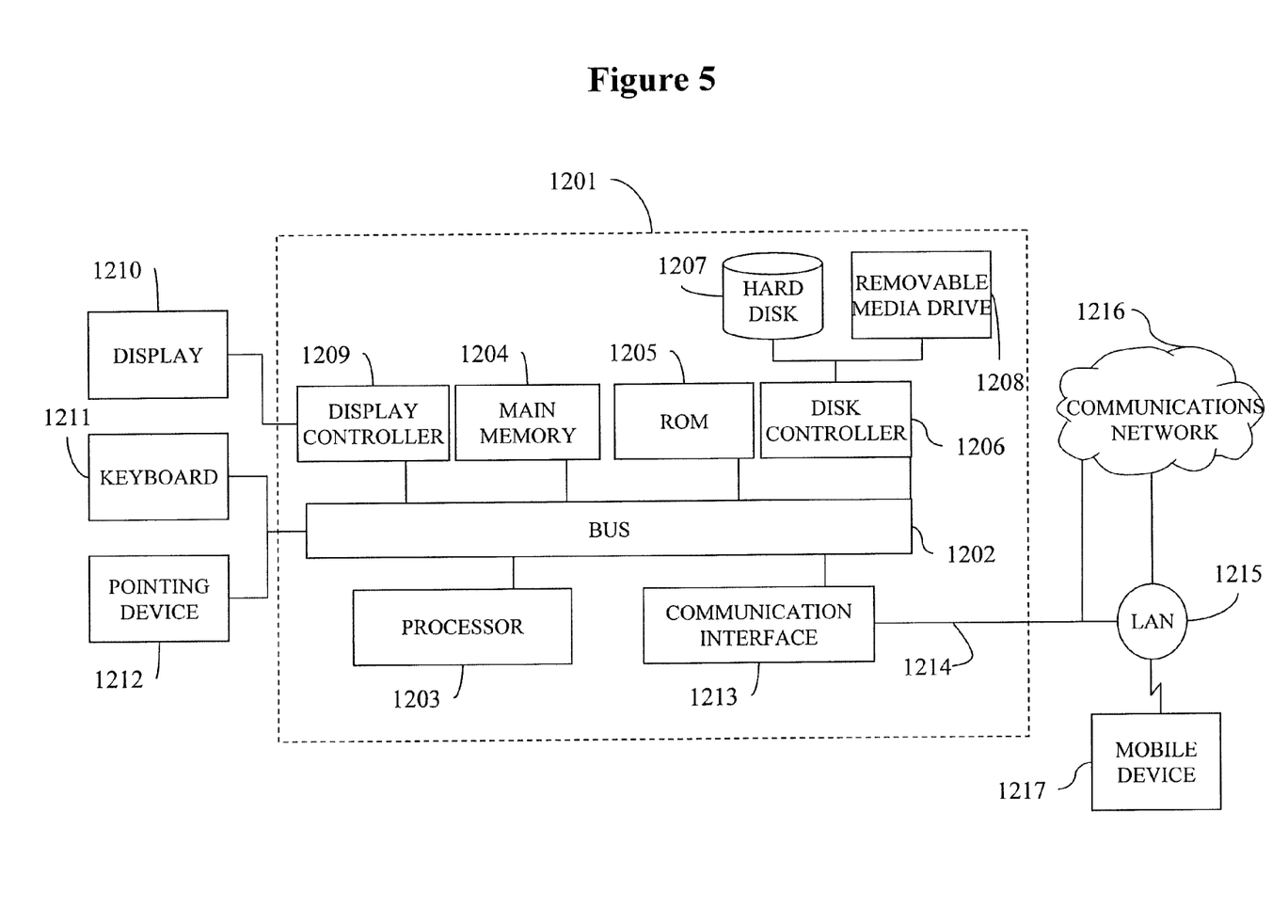
FIG. 5 illustrates a computer system upon which embodiments of the present disclosure may be implemented.

The aforementioned methods described above can be implemented using a computer system or programmable logic. FIG. 5 illustrates a computer system 1201 upon which embodiments of the present disclosure may be implemented. The computer system 1201 may include, for example, a processing circuit, module, or unit, which perform the above-described process.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as display 42 or a liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method for smoothing random event data obtained from a Positron Emission Tomography (PET) scanner, the method comprising:

obtaining initial random event data $u(s, \phi, t=0)=u_0(s, \phi)$, corresponding to t=0, the initial random event data corresponding to line-of-responses of the PET scanner;

calculating second-order central differences $u_{ss}$, $u_{\phi\phi}$ with respect to s, $\phi$;

calculating a gradient $u_t$, using $u_t=2(u_{ss}+u_{\phi\phi})-\lambda(u-u_0)$, where $\lambda$ is a constant parameter;

updating the random event data using $u(s, \phi, t_2)=u(s, \phi, t_1)+\Delta t\, u_t$, where $\Delta t=t_2-t_1$, $t_1=0$ in a first iteration, and $\Delta t$ is greater than 0; and repeating the steps of calculating the second-order central differences, calculating the gradient, and updating the random event data until a change in $u(s, \phi, t)$ from a previous iteration is less than a predetermined threshold value.

2. The method according to claim 1, wherein $\lambda$ has a value between 0.05 and 2.0.

3. The method according to claim 1, wherein $\lambda$ has a value between 0 and 0.01.

4. The method according to claim 1, wherein $\Delta t$ has a value between 0.05 and 0.1.

5. The method according to claim 1, wherein $u(s, \phi, t)$ converges when $$\sum_{alls}\sum_{all\varphi}(u(s,\varphi,t_k)-u(s,\varphi,t_{k+1}))^2$$

is less than the predetermined threshold value.

6. An apparatus for smoothing random event data obtained from a Positron Emission Tomography (PET) scanner, the apparatus comprising:

a processing circuit configured to obtain initial random event data $u(s, \phi, t=0)=u_0(s, \phi)$, corresponding to t=0, the initial random event data corresponding to lines-of-responses of the PET scanner, calculate second-order central differences $u_{ss}$, $u_{\phi\phi}$ with respect to s, $\phi$;

calculate a gradient $u_t$, using $u_t=2(u_{ss}+u_{\phi\phi})-\lambda(u-u_0)$, where $\lambda$ is a constant parameter, update the random event data using $u(s, \phi, t_2)=u(s, \phi, t_1)+\Delta t\, u_t$, where $\Delta t=t_2-t_1$, $t_1=0$ in a first iteration, and $\Delta t$ is greater than 0, and repeat the calculating the second-order central differences, calculating the gradient, and updating the random event data until a change in $u(s, \phi, t)$ from a previous iteration is less than a predetermined threshold value.

7. The apparatus according to claim 6, wherein $\lambda$ has a value between 0.05 and 2.0.

8. The apparatus according to claim 6, wherein $\lambda$ has a value between 0 and 0.01.

9. The apparatus according to claim 6, wherein $\Delta t$ has a value between 0.05 and 0.1.

10. The apparatus according to claim 6, wherein $u(s, \phi, t)$ converges when $$\sum_{alls}\sum_{all\varphi}(u(s,\varphi,t_k)-u(s,\varphi,t_{k+1}))^2$$

is less than the predetermined threshold value.

11. A method for smoothing random event data obtained from a Positron Emission Tomography (PET) scanner, the method comprising:

obtaining initial random event data $u(s, \phi, z, \theta, t=0)=u_0(s, \phi, z, \theta)$, corresponding to t=0, the initial random event data corresponding to lines-of-responses of the PET scanner;

calculating second-order central differences $u_{ss}$, $u_{\phi\phi}$, $u_{zz}$, $u_{\theta\theta}$, with respect to s, $\phi$, z, $\theta$;

calculating a gradient $u_t$, using $u_t=2(u_{ss}+u_{\phi\phi}+u_{zz}+u_{\theta\theta})-\lambda(u-u_0)$, where $\lambda$ is a constant parameter;

updating the random event data using $u(s, \phi, z, \theta, t_2)=u(s, \phi, z, \theta, t_1)+\Delta t\, u_t$, where $\Delta t=t_2-t_1$, $t_1=0$ in a first iteration, and $\Delta t$ is greater than 0; and repeating the steps of calculating the second-order central differences, calculating the gradient, and updating the random event data until a change in $u(s, \phi, z, \theta, t)$ from a previous iteration is less than a predetermined threshold value.

12. The method according to claim 11, wherein $\lambda$ has a value between 0.05 and 2.0.

13. The method according to claim 11, wherein $\lambda$ has a value between 0 and 0.01.

14. The method according to claim 11, wherein $\Delta t$ has a value between 0.05 and 0.1.

15. The method according to claim 11, wherein u(s, φ, z, θ, t) converges when $$\sum_{alls}\sum_{all\varphi}\sum_{allz}\sum_{all\theta}(u(s, \varphi, z, \theta, t_k) - u(s, \varphi, z, \theta, t_{k+1}))^2$$

is less than the predetermined threshold value.

16. The method according to claim 11, further comprising:
applying a mask so that the obtained initial random event data is restricted to a region containing all measurable line-of-responses of the PET scanner.

17. An apparatus for smoothing random event data obtained from a Positron Emission Tomography (PET) scanner, the method comprising:
a processing circuit configured to
obtain initial random event data $u(s, \phi, z, \theta, t=0) = u_0(s, \phi, z, \theta)$, corresponding to t=0, the initial random event data corresponding to lines-of-responses of the PET scanner;
calculate second-order central differences $u_{ss}$, $u_{\phi\phi}$, $u_{zz}$, $u_{\theta\theta}$, with respect to s, φ, z, θ;
calculate a gradient $u_t$, using $u_t = 2(u_{ss} + u_{\phi\phi} + u_{zz} + u_{\theta\theta}) - \lambda(u-u_0)$, where λ is a constant parameter;
update the random event data using $u(s, \phi, z, \theta, t_2) = u(s, \phi, z, \theta, t_1) + \Delta t\, u_t$, where $\Delta t = t_2 - t_1$, $t_1 = 0$ in a first iteration, and Δt is greater than 0; and
repeat the calculating the second-order central differences, calculating the gradient, and updating the random event data until a change in u(s, φ, z, θ, t) from a previous iteration is less than a predetermined threshold value.

18. The apparatus according to claim 17, wherein λ has a value between 0.05 and 2.0.

19. The apparatus according to claim 17, wherein λ has a value between 0 and 0.01.

20. The apparatus according to claim 17, wherein Δt has a value between 0.05 and 0.1.

21. The apparatus according to claim 17, wherein u(s, φ, z, θ, t) converges when $$\sum_{alls}\sum_{all\varphi}\sum_{allz}\sum_{all\theta}(u(s, \varphi, z, \theta, t_k) - u(s, \varphi, z, \theta, t_{k+1}))^2$$

is less than the predetermined threshold value.

22. The apparatus according to claim 17, wherein the processing circuit is further configured to apply a mask so that the obtained initial random event data is restricted to a region containing all measurable line-of-responses of the PET scanner.

* * * * *